US012480712B2

(12) United States Patent
Zuang et al.

(10) Patent No.: US 12,480,712 B2
(45) Date of Patent: Nov. 25, 2025

(54) MANIPULATOR ARM, AND MANIPULATOR COMPRISING A MANIPULATOR ARM

(71) Applicant: TMT TAPPING MEASURING TECHNOLOGY Sarl, Luxembourg (LU)

(72) Inventors: Max Zuang, Dudelange (LU); Romain Clesen, Colpach-Haut (LU); Marc Flammang, Garnich (LU)

(73) Assignee: TMT TAPPING MEASURING TECHNOLOGY SÁRL, Luxembourg (LU)

( * ) Notice: Subject to any disclaimer, the term of this patent is extended or adjusted under 35 U.S.C. 154(b) by 0 days.

(21) Appl. No.: 18/716,757

(22) PCT Filed: Dec. 9, 2021

(86) PCT No.: PCT/EP2021/085010
§ 371 (c)(1),
(2) Date: Jun. 5, 2024

(87) PCT Pub. No.: WO2023/104309
PCT Pub. Date: Jun. 15, 2023

(65) Prior Publication Data

US 2025/0052499 A1 Feb. 13, 2025

(51) Int. Cl.
*F27D 3/15* (2006.01)
*B25J 15/00* (2006.01)

(52) U.S. Cl.
CPC ........ *F27D 3/1527* (2013.01); *B25J 15/0019* (2013.01)

(58) Field of Classification Search
CPC ............................ F27D 3/1527; B25J 15/0019
(Continued)

(56) References Cited

U.S. PATENT DOCUMENTS 3,121,769 A * 2/1964 Horn .................... C21C 5/4653 266/271
3,709,477 A * 1/1973 Baumer .................... C21B 7/12 266/273
(Continued)

FOREIGN PATENT DOCUMENTS

CN 201407903 Y 2/2010
CN 102317477 A 1/2012
(Continued)

OTHER PUBLICATIONS

EP0816516, Victor et al., Tap Hole Drilling Machine, Oct. 4, 2001 (Year: 2001).*

(Continued)

*Primary Examiner* — Jessee R Roe
*Assistant Examiner* — Michael Aboagye
(74) *Attorney, Agent, or Firm* — Dickinson Wright PLLC; Andrew D. Dorisio

(57) ABSTRACT

A manipulator arm for being connected to a manipulator chassis frame disposed in particular in the periphery of a metallurgical smelting furnace includes a proximal end for being connected to the manipulator chassis frame and a distal end equipped with a first tool receptacle and serving to be connected to a shovel or bucket. The manipulator arm has a second tool receptacle at its distal end, the second tool receptacle being formed irrespective of the first tool receptacle and being intended to be connected to a hammer mill or a drilling machine.

7 Claims, 10 Drawing Sheets

(58) Field of Classification Search
USPC ..... 266/45
See application file for complete search history.

(56) References Cited

U.S. PATENT DOCUMENTS

| | | | | | |
|---|---|---|---|---|---|
| 4,106,760 | A | * | 8/1978 | Kono | F27D 1/1636 118/317 |
| 4,558,791 | A | | 12/1985 | Mosley | |
| 4,796,869 | A | * | 1/1989 | Mailliet | C21B 7/12 266/271 |
| 5,414,887 | A | | 5/1995 | Abel | |
| 5,735,647 | A | | 4/1998 | Woodings | |

FOREIGN PATENT DOCUMENTS

| | | | | | |
|---|---|---|---|---|---|
| CN | 102852169 | A | | 1/2013 | |
| CN | 204418241 | U | | 6/2015 | |
| CN | 205897859 | | | 1/2017 | |
| DE | 3136236 | | * | 11/1982 | F27D 1/1694 |
| DE | 3136236 | A1 | | 11/1982 | |
| EP | 0816516 | | * | 10/2001 | C21B 7/12 |
| GB | 2210151 | | * | 1/1989 | C21C 5/4653 |
| JP | H06264124 | A | | 9/1994 | |
| JP | H0731848 | U | | 6/1995 | |
| JP | H08199618 | | * | 8/1996 | E02F 3/964 |
| JP | H08199618 | A | | 8/1996 | |
| RU | 1789496 | A1 | | 1/1993 | |
| SU | 854989 | A1 | | 8/1981 | |

OTHER PUBLICATIONS

JPH08199618, Shirai et al. , Working Part of Back Hoe, Aug. 6, 1996 (Year: 1996).*
DE3136236, Rostowski et al. , Arrangement for clearing blast-furnace channel and the like, Nov. 25, 1982 (Year: 1982).*
Chilean Office Action; Appl. No. 202401587; dated Feb. 13, 2025; Original and English.
Chinese Office Action; Appl. No. 202180104781.7; dated Dec. 13, 2024; English.

* cited by examiner

Fig. 2
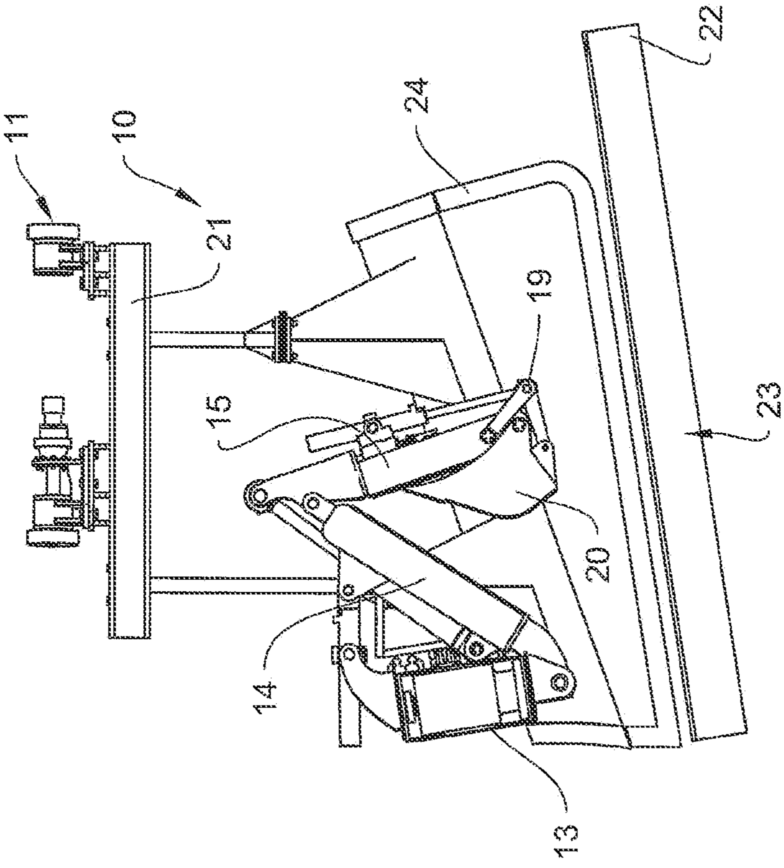
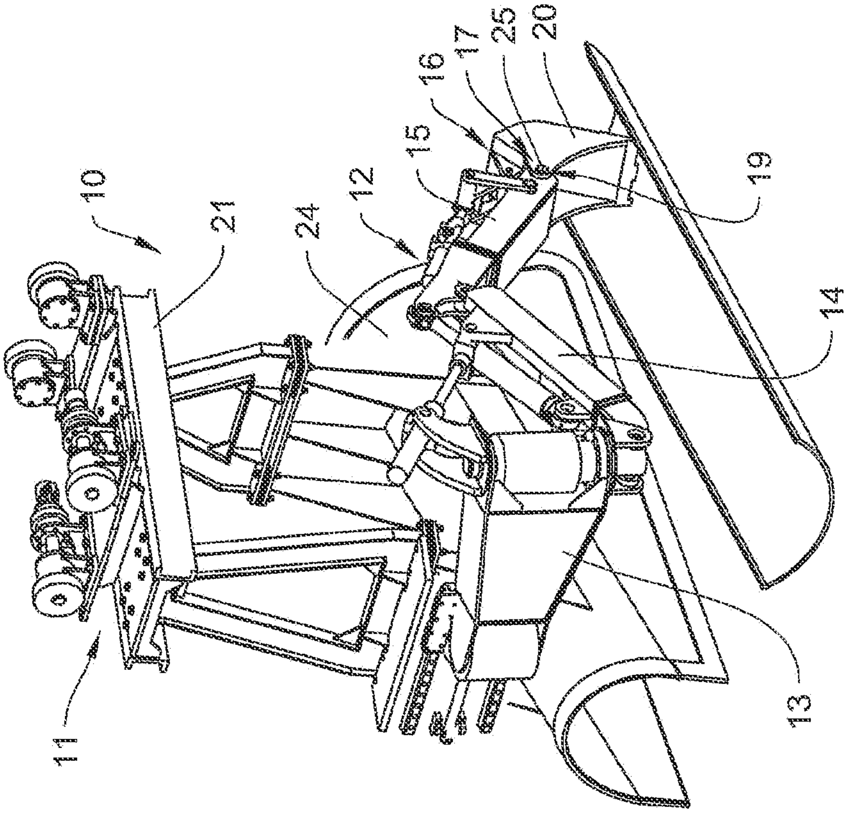
Fig. 1

MANIPULATOR ARM, AND MANIPULATOR COMPRISING A MANIPULATOR ARM

TECHNICAL FIELD

The invention relates to a manipulator arm for being connected to a manipulator chassis frame disposed in particular in the periphery of a metallurgical smelting furnace, the manipulator arm having a proximal end for being connected to the manipulator chassis frame and a distal end equipped with a first tool receptacle and serving to be connected to a bucket. Furthermore, the invention relates to a manipulator equipped with a manipulator arm of this kind.

BACKGROUND

For the operation of a metallurgical smelting furnace, a plurality of elements is required which are disposed in the periphery of the smelting furnace and for instance comprise a tapping of the furnace for removing the molten metal in a tapping spout and for servicing the tapping spout. For the furnace tapping, tap hole drilling units are regularly used which fixedly installed adjacent to the tap hole, are equipped with a drill rod and allow opening the tap hole. Moreover, a mud gun is provided for closing the tap hole. Furthermore, fixedly installed manipulators are also often provided in the area of the tap hole which allow handling protective covers by means of which the tapping spout can be covered down-stream of the tap hole.

As becomes clear from the description above, tight spatial constraints for the use of elements for servicing the tapping spout are the result of the plurality of elements disposed in the smelting furnace's periphery, the servicing requiring in particular a fracturing of melt remains or slag remaining in the tapping spout after a furnace tapping along with their removal from the tapping spout. As a rule, the remains are spalled by means of a hammer mill so the remains can be subsequently removed from the tapping spout using a bucket; these activities are carried out manually or a manipulator equipped with a suitable hammer mill is used to carry out these activities and, additionally, a manipulator is used which is equipped with an excavator bucket.

For this purpose, the manipulators hitherto used have a manipulator arm which is equipped with a tool adapter at its distal end, the tool adapter allowing disposing either a hammer mill or an excavator bucket thereon; the supply lines of the regularly hydraulically driven tools have to be connected anew each time the tools are switched. This results in corresponding assembly times which are tied to a tool switch which in most instances has to take place away from the operation site due to the spatial constraints in the furnace's periphery. Since the hammer mill and the excavator bucket are used successively, the tool switch requires correspondingly long servicing times for the tapping spout, during which the smelting furnace cannot be operated, which is tied to corresponding operational standstills.

SUMMARY

The object of the invention is therefore to propose a manipulator arm which allows servicing the tapping spout within a shorter servicing time.

According to the invention, the manipulator arm has a second tool receptacle at its distal end, the second tool receptacle being formed irrespectively of the first tool receptacle and being intended to be connected to a hammer mill or a drilling machine, meaning a permanent parallel placement of the hammer mill or milling machine and the bucket makes a switching of the tools redundant when servicing a tapping spout, and a manipulator chassis frame equipped with the manipulator arm only has to be moved to the operation site for servicing.

The assembly work hitherto necessitated by the switching of tools becomes redundant, meaning the servicing time required for servicing the tapping spout can be reduced significantly.

Owing to the possible reduction of the servicing time, it is also possible to carry out servicing efforts on the tapping spout in shorter intervals, without compromising the economical operation of the smelting furnace. Thus, it is possible to increase the service life of the tapping spouts.

The permanent parallel placement of a hammer mill or a milling machine with a bucket at one and the same manipulator also decreases the investment costs for an execution, which would take place using a manipulator, of servicing efforts which would otherwise be carried out manually and are prone to accidents, meaning work safety is increased while simultaneously significantly decreasing investment costs than is the case in the hitherto required use of two manipulators.

The manipulator arm can be used everywhere where fracturing or demolition works are to be carried out with subsequent removal of the fractured material.

If the first tool receptacle is equipped with a swivel joint element for connecting the bucket in such a manner that it can be swiveled about a swivel axis, which is disposed at the distal end, in relation to the distal end, and the second tool receptacle is equipped with a linear guide element for guiding the second tool receptacle in such a manner along a translational axis intersecting the swivel axis that a tool of the hammer mill or the milling machine received in the second tool receptacle is guided past the bucket, a particularly compact design of the manipulator arm with a closely adjacent relative arrangement of the two tool receptacles is possible. On the other hand, an operation of the manipulator arm using one and the same kinematic system when using both the hammer mill or the milling machine and the bucket is possible.

It is particularly advantageous if the second tool receptacle is formed in such a manner in an arm section forming the distal end of the manipulator arm and equipped with the swivel axis that the arm section forms a guide casing receiving the tool receptacle and having the linear guide element formed in the guide casing and the swivel axis of the first tool receptacle is disposed within the arm section together with the translational axis of the second tool receptacle so a kinematic design of the manipulator arm equally optimized with regard to the strain of the manipulator arm during use of the tool is possible for both the use of the hammer mill or machining mill and of the bucket.

In another preferred embodiment of the manipulator arm, the second tool receptacle is disposed at a lateral offset to an arm section forming the distal end of the manipulator arm in such a manner that a guide casing receiving the second tool receptacle is disposed beside the arm section, meaning both the second tool receptacle and the linear guide element for guiding the second tool receptacle can be formed irrespectively of the geometry of the arm section.

If the second tool receptacle has a tool slide disposed in the guide casing so as to be longitudinally displaceable, the tool slide can be formed as an adapter for differently designed hammer mills or machining mills, meaning the manipulator arm can be used in combination with differently designed hammer mills or machining mills via the use of a corresponding tool slide and the user is consequently free to choose a hammer mill or a machining mill as the tool for fracturing remains formed in the tapping spout. In particular, the user can select to use a hammer mill or a machining mill.

The manipulator according to the invention is equipped with a manipulator arm according to the invention, the manipulator chassis frame being designed as a non-rail-bound manipulator chassis frame in a first variation of the manipulator as intended by the invention. Preferably, the manipulator chassis frame is designed as a crawler track, so the manipulator arm can also be used on unpaved surfaces. In particular when the surface is paved, the chassis frame can also be formed as a wheel chassis frame. In particular in the instances mentioned exemplarily above, the manipulator can also be referred to as an excavator.

In another variation of the manipulator as intended by the invention, the manipulator chassis frame is rail-bound, meaning a particularly precise and reproducible displacement of the manipulator arm, as is required in particular in the periphery of a metallurgical smelting furnace, is easily realizable.

It is particularly advantageous in this case if the manipulator arm is guided in a suspended placement on the rails, meaning neither ground obstacles can disturb the operation of the manipulator nor the operation presumes defined ground conditions when using the manipulator in a metallurgical smelting furnace's periphery.

BRIEF DESCRIPTION OF THE DRAWINGS

In the following, a preferred embodiment of a manipulator arm and a preferred embodiment of a manipulator equipped with a manipulator arm is described in further detail using the drawing.

FIG. 1 shows a manipulator having a manipulator arm disposed on a manipulator chassis frame in a first embodiment and in an operational position;

FIG. 2 shows the manipulator shown in FIG. 1 with the manipulator arm disposed in an idle position;

DETAILED DESCRIPTION

Figure 3:
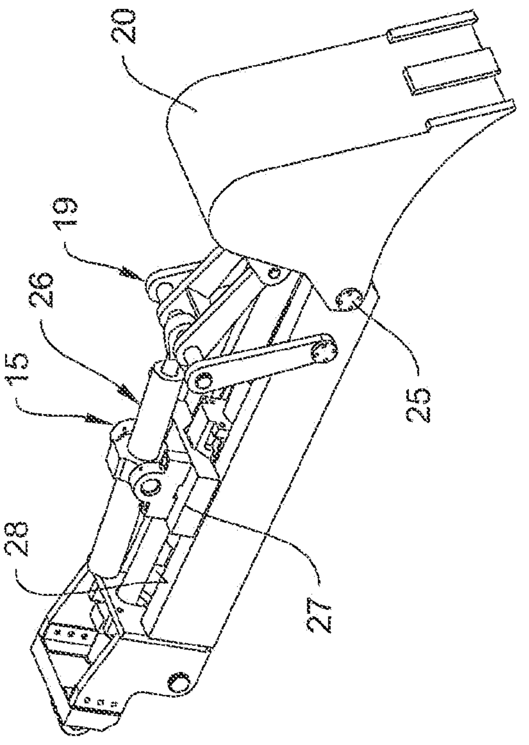
FIG. 3 shows an individual view of the distal arm section of the manipulator arm shown in FIG. 1 in a bucket configuration.

FIG. 1 shows a manipulator 10, which has a manipulator arm 12 disposed on a manipulator chassis frame 11 and equipped with a plurality of arm sections 13, 14 and 15 connected to each other in a swivel-jointed manner. Arm section 15 forming the distal end of manipulator arm 12 has two tool receptacles 17, 18, which are shown in particular in FIG. 6, at its distal end 16: FIG. 1 shows that tool receptacle 17 is equipped with a swivel joint element 19 for a connection of a bucket 20 with respect to the distal end.

Manipulator 10 shown in FIGS. 1 and 2 is an exemplary embodiment in which manipulator chassis frame 11 is guided on a rail arrangement 21 so as to be suspended, rail arrangement 21 being located in the area of a tap hole of a metallurgical smelting furnace (not illustrated), bucket 20 disposed on manipulator arm 12 enabling excavating a tapping spout 23 positioned with its inlet end 22 in front of the tap hole.

In the case of the shown exemplary embodiment, manipulator chassis frame 11 is equipped with a protective cover 24 on its underside, protective cover 24 allowing covering tapping spout 23 when manipulator chassis frame 11 is suitably positioned over tapping spout 23 so liquid metal is prevented from entering the surroundings of tapping spout 23 during a furnace tapping. As FIG. 2 further shows, manipulator arm 12 is in the cover position, which is shown in FIG. 2 and in which protective cover 24 is positioned over tapping spout 23 by means of manipulator chassis frame 11, in its idle position in which arm sections 13, 14 and 15 are swiveled against each other and bucket 20 is swiveled against distal arm section 15 by means of swivel joint element 19.

Figure 4:
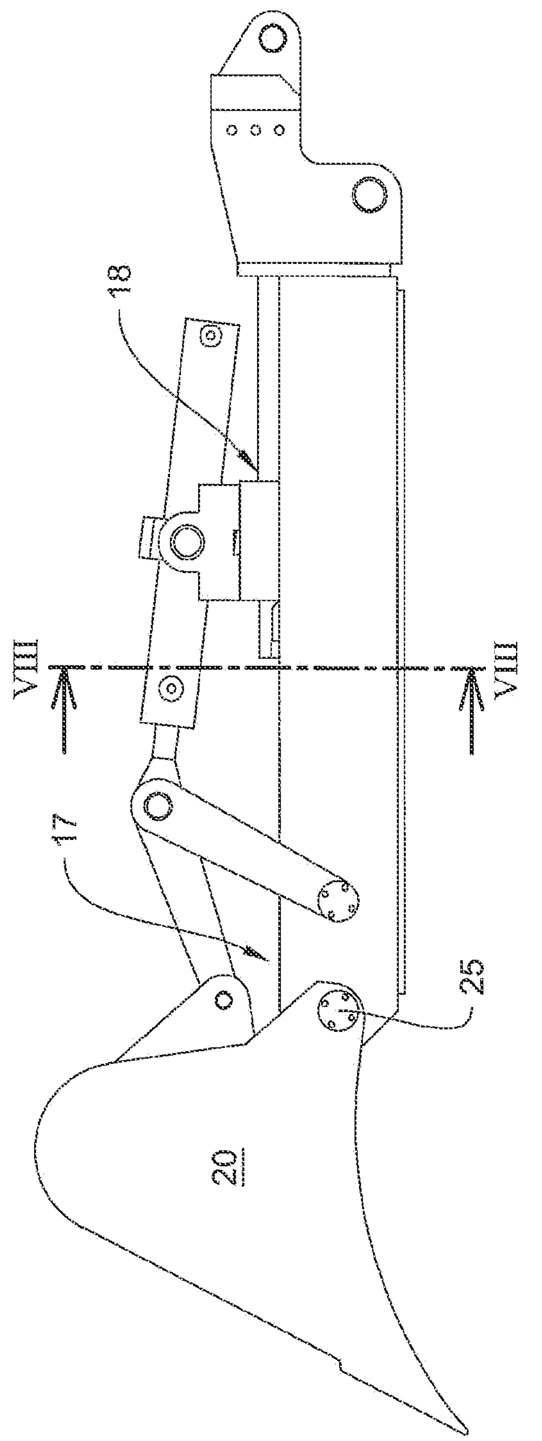
FIG. 4 shows a lateral view of the distal arm section of the manipulator arm shown in FIG. 3.

In FIGS. 3 and 4, distal arm section 15 is shown according to the work position of manipulator arm 12 as shown in FIG. 1, bucket 20 being swung open to its open position by means of swivel joint element 19 when manipulator arm 12 is in the work position in order to remove material from tapping spout 23 via a subsequent swivel movement of bucket 20 about a swivel axis 25, the swivel movement being carried out by means of swivel joint element 19.

Figure 9:
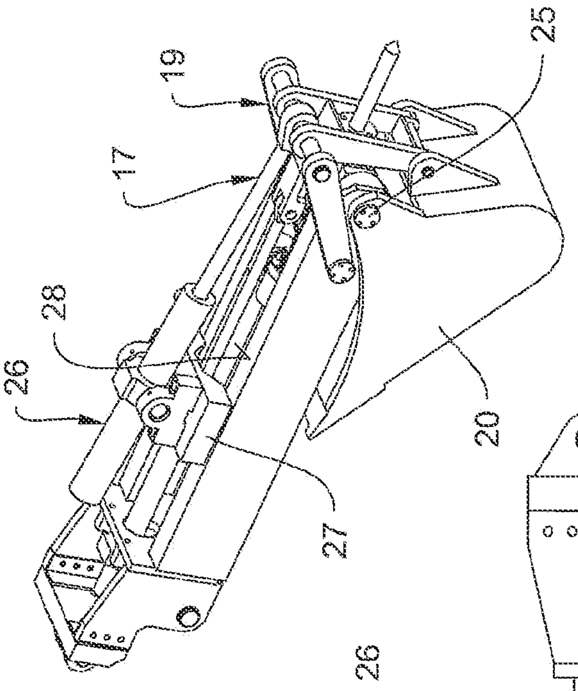
FIG. 9 shows the distal arm section of the manipulator arm shown in FIG. 3 in a hammer configuration.

As a combined view of FIGS. 3 and 9 shows, swivel joint element 19 is driven by a drive cylinder 26 in the case of the present exemplary embodiment in order to execute the swivel movement of bucket 20 and to thus move bucket 20 from the open position shown in FIG. 3 to the closed position shown in FIG. 9. Drive cylinder 26 is mounted in a receptacle 27, which is disposed on an upper side 28 of arm section 15, so as to be swivable.

Figure 5:
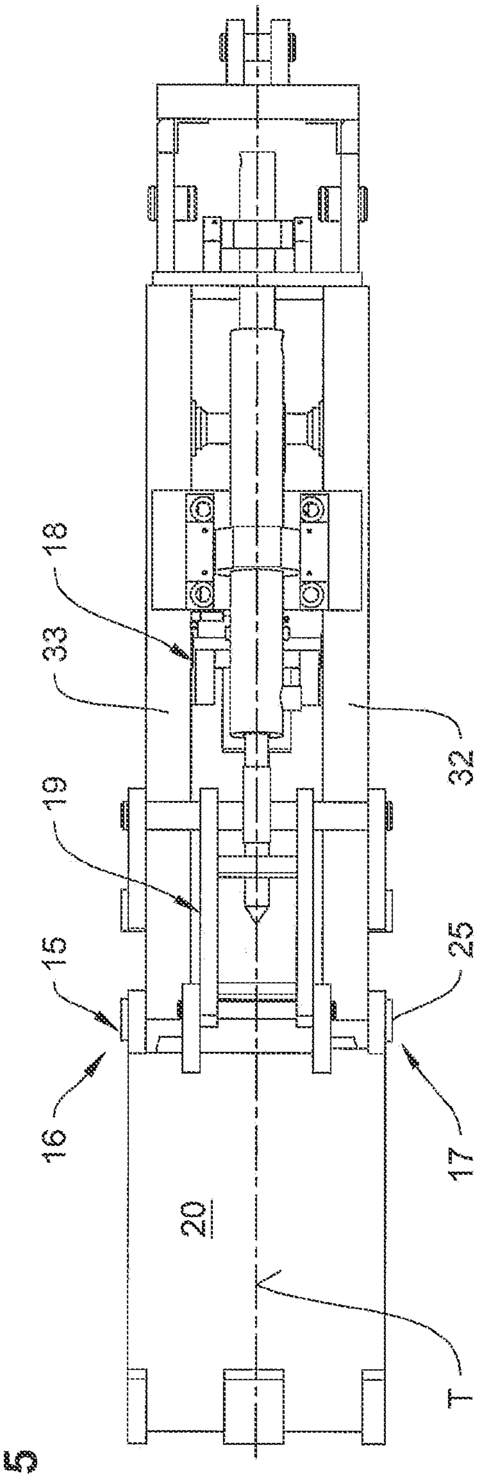
FIG. 5 shows a top view of the arm section shown in FIG. 4.
Figure 6:
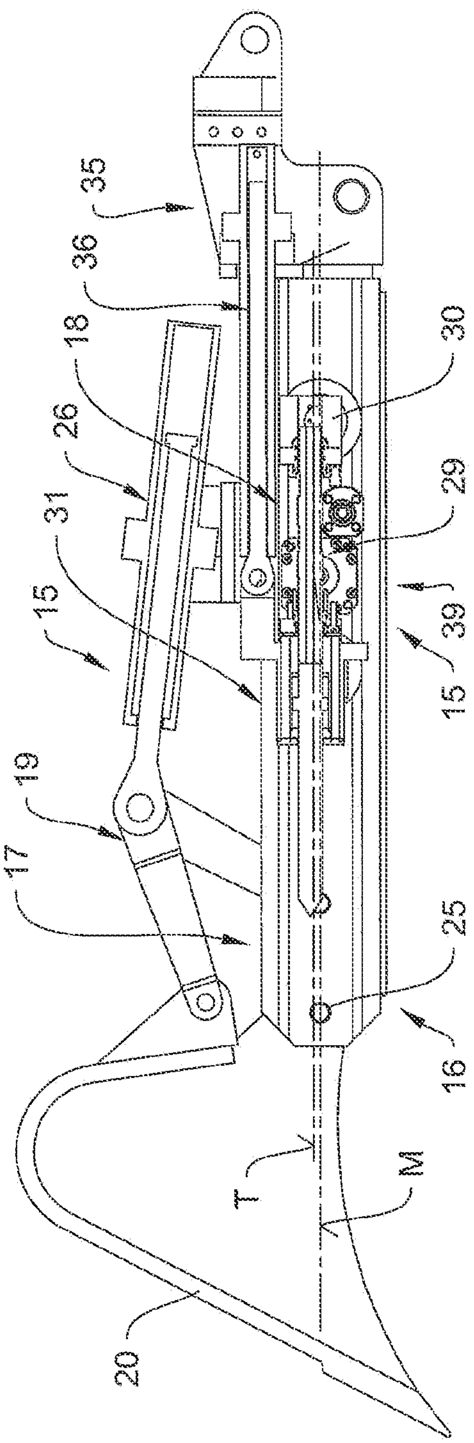
FIG. 6 shows a longitudinal cut view of the arm section shown in FIG. 4 with a bucket disposed in an open position.

As a combined view of FIGS. 5 and 6 shows, distal arm section 15 of manipulator arm 12 is equipped with second tool receptacle 18 in addition to first tool receptacle 17 formed on its distal end 16 and comprising swivel joint element 19 and swivel axis 25, second tool receptacle 18 serving to connect a hammer mill 29 in the presently shown exemplary embodiment and having a tool slide 30, which forms a linear guide element 39 for hammer mill 29 in conjunction with arm section 15 forming a guide casing 31.

Figure 8:
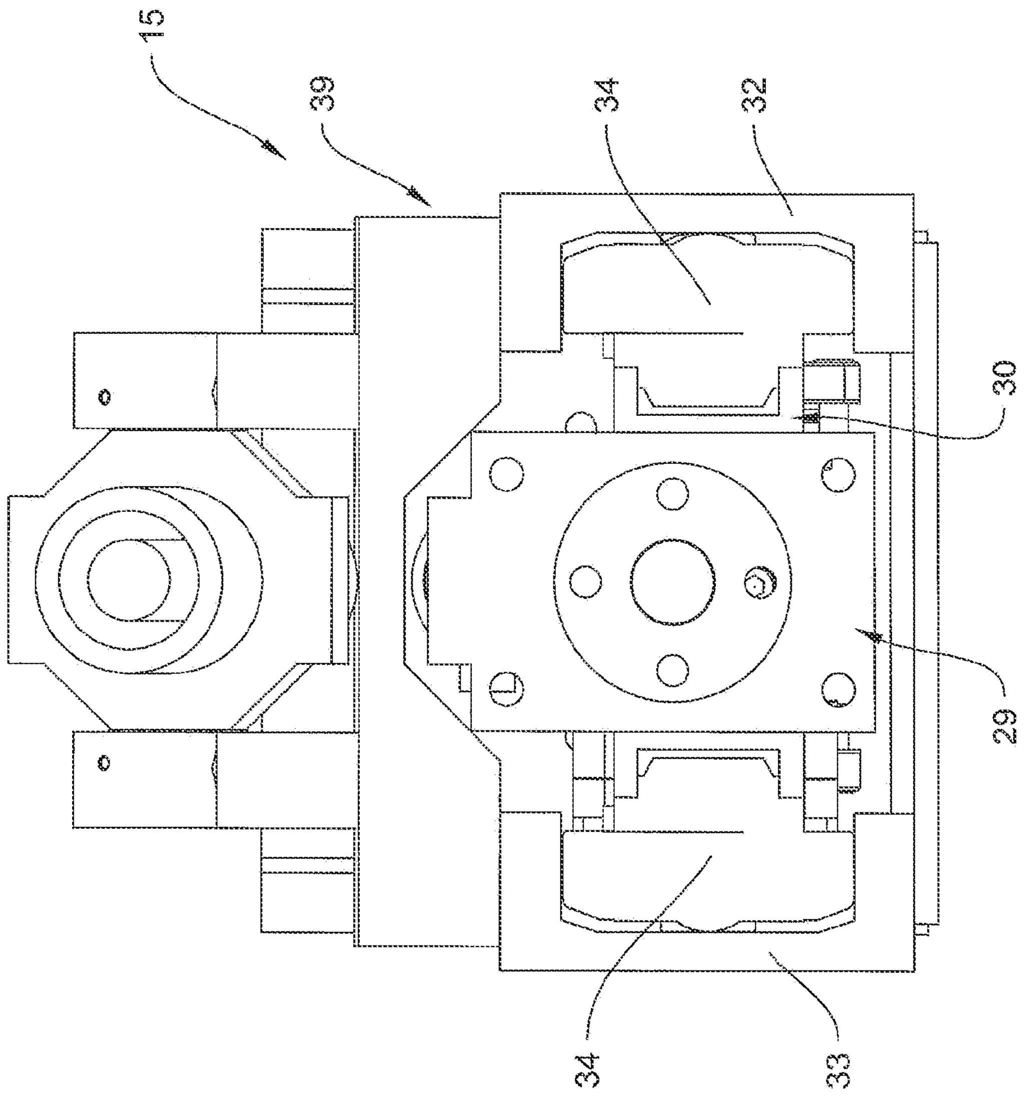
FIG. 8 shows a transverse cut view of the arm section shown in FIG. 4 according to cut VIII-VIII in FIG. 4.

As in particular FIG. 8 shows, arm section 15 has two lateral walls 32, 33 for forming a preferred embodiment of guide casing 31, lateral walls 32, 33 being designed in the manner of a profile rail and being made of two C profiles in the case of the present exemplary embodiment, the C profiles being disposed opposite each other so that their openings face each other and serving to longitudinally guide tool slide 30 by means of guide rolls 34 disposed on tool slide 30. By means of tool slide 30, hammer mill 39 can be guided on a translational axis T (FIGS. 5 and 6) which nearly intersects with longitudinal center axis M of arm section 15 in the present instance. Instead of the previously described roll guide, the hammer mill and/or the tool slide of the hammer mill can be guided in a sliding guide.

Figure 7:
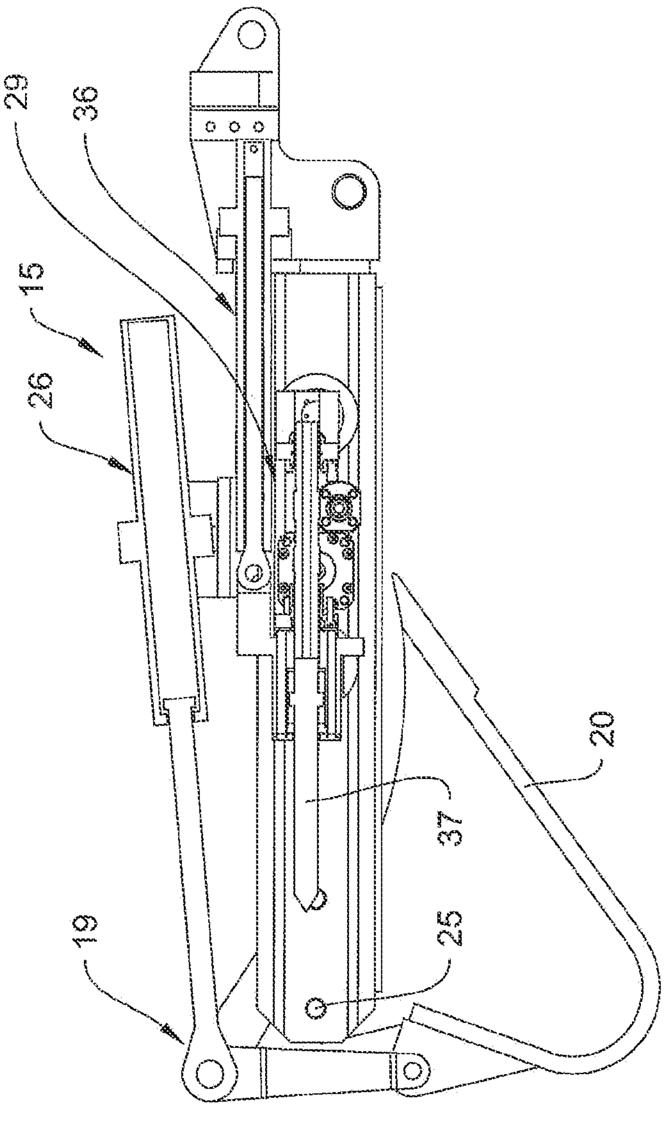
FIG. 7 shows a longitudinal cut view of the arm section shown in FIG. 4 with a bucket in a closed position.

In the bucket configuration of arm section 15 shown in FIG. 6, hammer mill 29 is in its out-of-operation position in which tool slide 30 positions tool slide 30 in its retracted position by means of an adjust cylinder 36 connected to tool slide 30 and to a proximal end 35 of arm section 15. In this out-of-operation position of hammer mill 29, bucket 20 can be swiveled from the open position shown in FIG. 6 to the closed position shown in FIG. 7 by means of drive cylinder 26 acting on bucket 20 via swivel joint element 19, without bucket 20 colliding with a hammer chisel 37 inserted in hammer mill 29 and disposed on translational axis T in the process.

Figure 10:
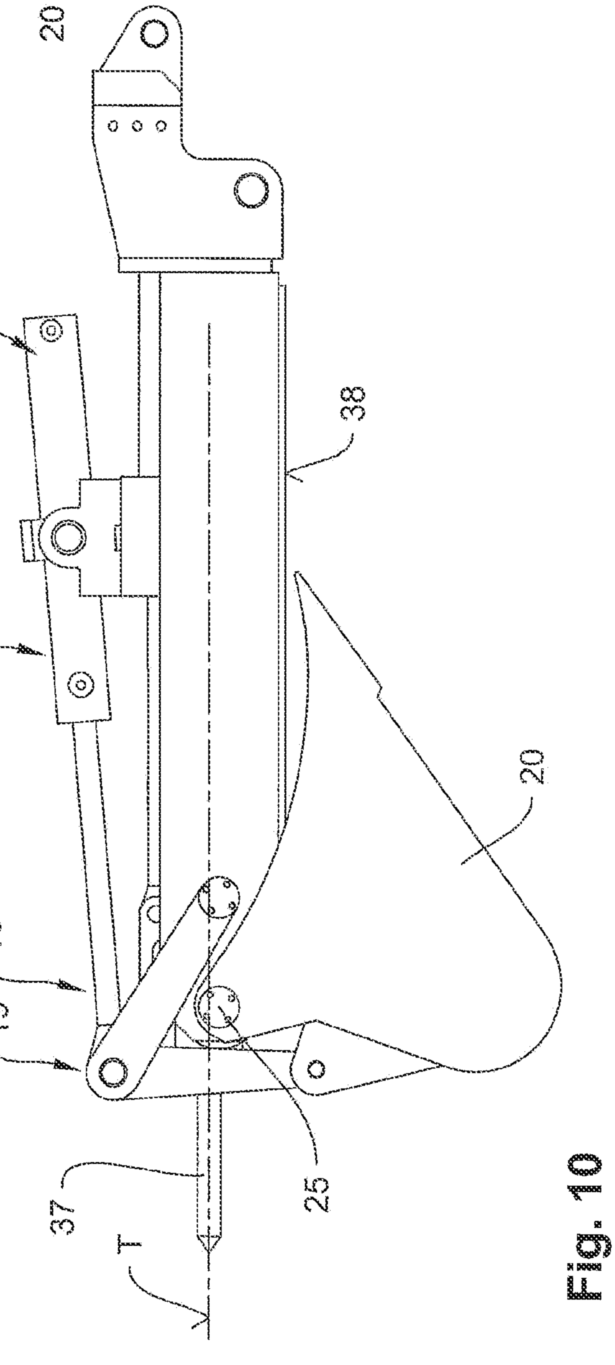
FIG. 10 shows a lateral view of the arm section shown in FIG. 9.
Figure 11:
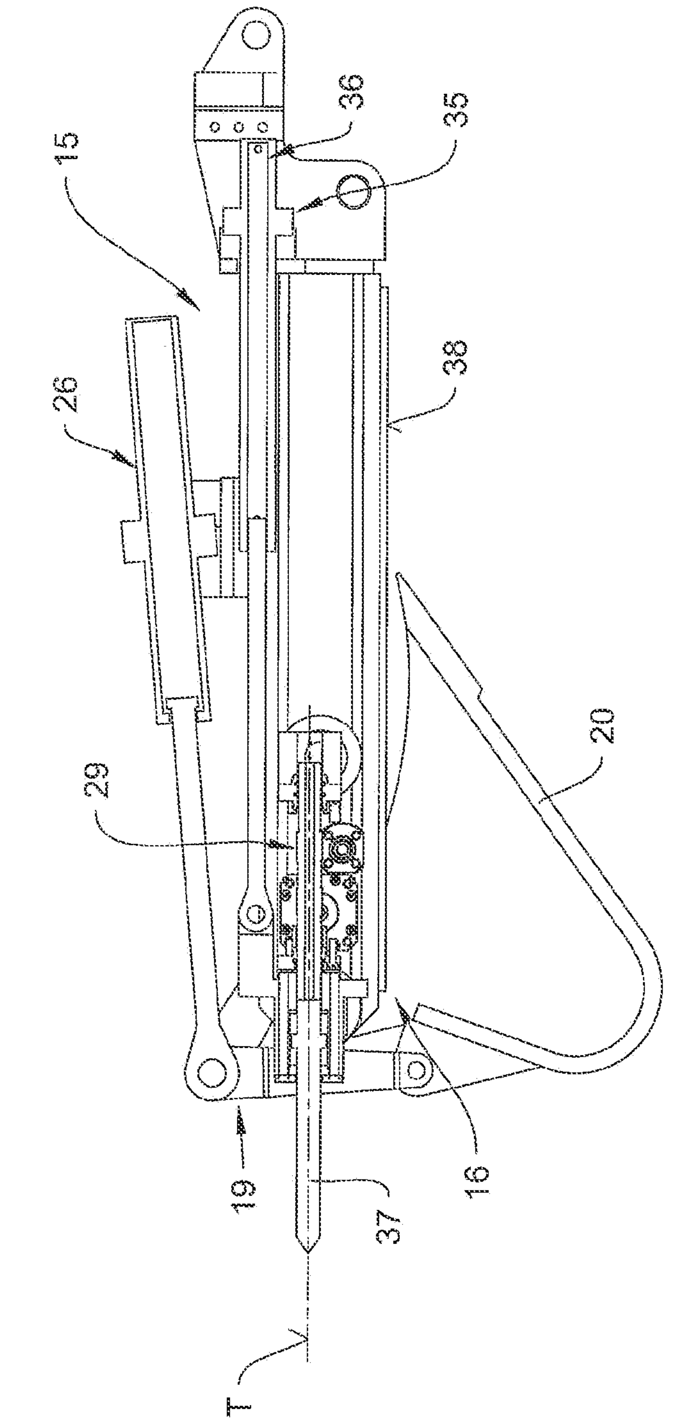
FIG. 11 shows a longitudinal cut view of the arm section shown in FIG. 10.

In the hammer configuration of arm section 15 shown in FIGS. 10 and 11, bucket 20 is in its out-of-operation position which coincides with the closed position and in which bucket 20 is swiveled about swivel axis 25 towards an underside 38 of arm section 15 by means of drive cylinder 26 acting on bucket 20 via swivel joint element 19. In this out-of-operation position of bucket 20, as shown in FIG. 10, hammer mill 29 can be displaced to its operating position via adjust cylinder 36 (FIG. 6) connected to tool slide 30 and to proximal end 35, hammer chisel 37 of hammer mill 29 being guided past bucket 20 on translational axis T, intersects with swivel axis 25, and protruding from distal end 16 of arm section 15 in this operating position.

Figure 12:
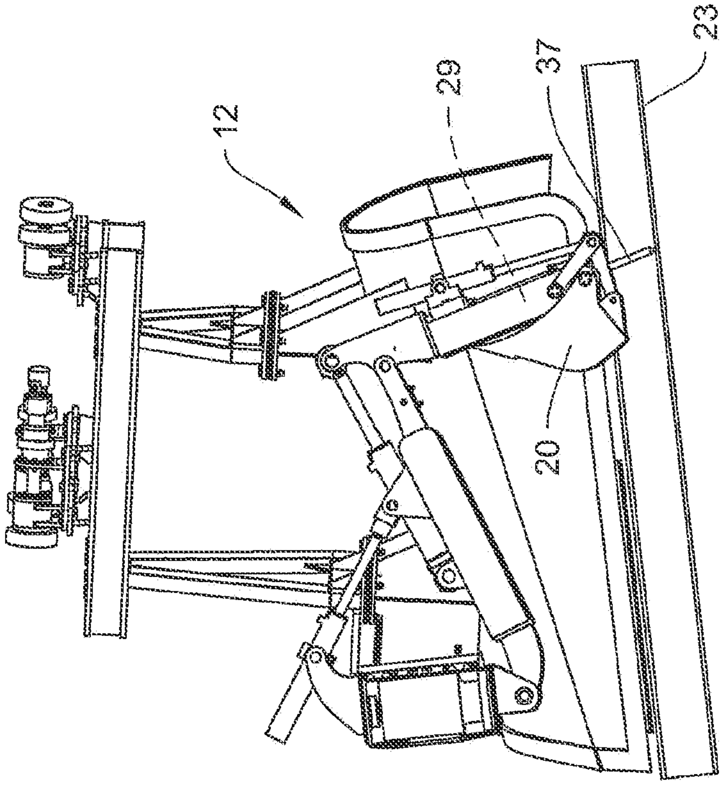
FIG. 12 shows the manipulator shown in FIG. 1 in the hammer configuration.

In this hammer configuration of arm section 15, hammer chisel 37, as shown in FIG. 12, can be positioned within tapping spout 23 by means of manipulator arm 12 instead of bucket 20 shown in FIG. 1 so hammer chisel 37 can be used via hammer mill 29 in an oscillating movement on translational axis T for fracturing remains in tapping spout 23 after a tapping. After displacing arm section 15 to the previously described bucket configuration (FIGS. 5 and 6), in which hammer mill 29 is in its out-of-operation position shown in FIG. 6 with hammer chisel 37 and/or tool slide 30, the remains can be removed from tapping spout 23 without significantly changing the position of the manipulator arm.

Figure 13:
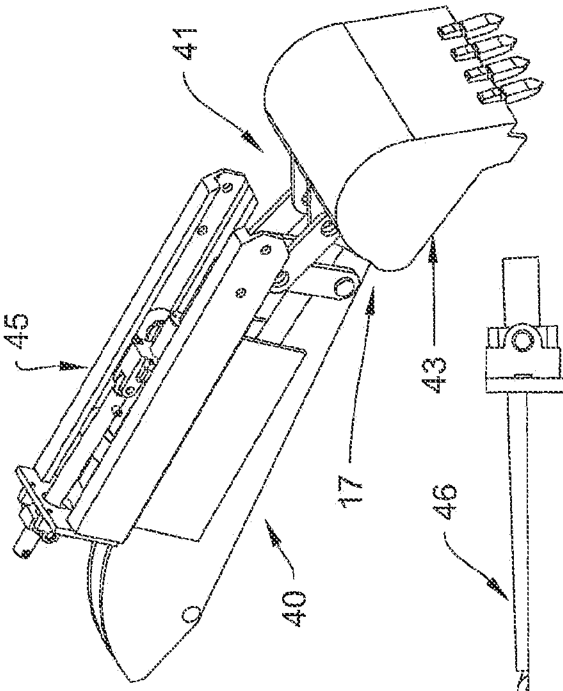
FIG. 13 shows the arm section shown in FIG. 3 according to another embodiment of the manipulator arm.
Figure 14:
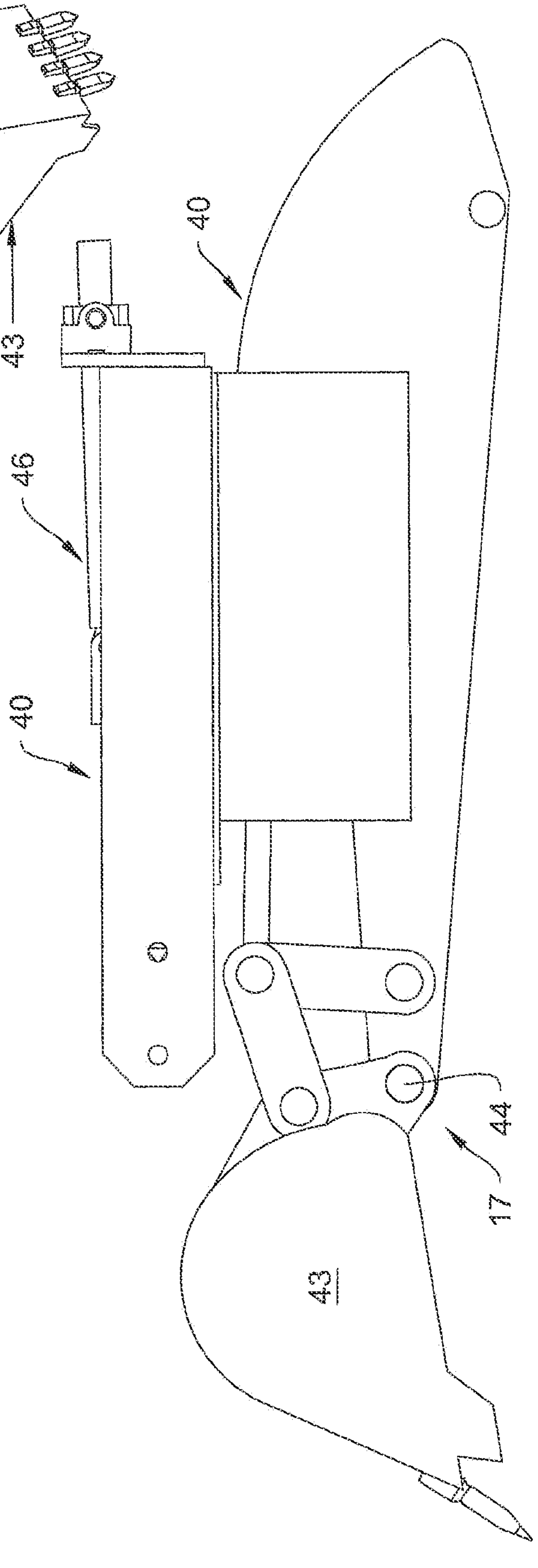
FIG. 14 shows a lateral view of the arm section shown in FIG. 13.
Figure 15:
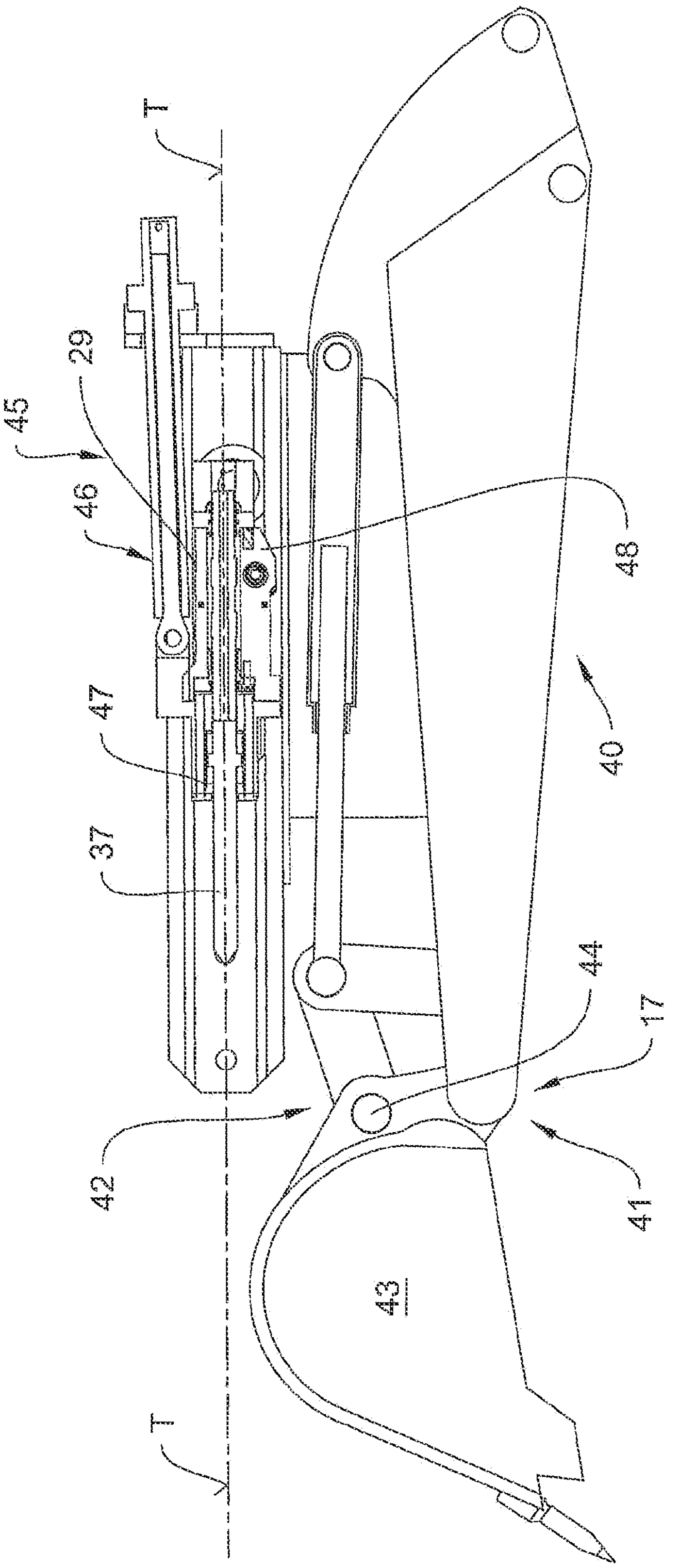
FIG. 15 shows a longitudinal cut of the arm section shown in FIG. 13.

In FIGS. 13 to 15, a distal arm section 40 is shown in a further embodiment, in which, in contrast to second tool receptacle 18 disposed within arm section 15 in the exemplary embodiment described above, which, in addition to a first tool receptacle 42 disposed at distal end 41 and having a swivel axis 44 for connecting a bucket 43, is a a second tool holder 45 is provided which is disposed at a lateral offset to arm section 40 and has a guide casing 46 formed irrespectively of arm section 40 and having a tool slide 48 disposed so as to be longitudinal displaceable in guide casing 46 in order to define a translation axis T.

As can be seen from the illustrations in FIGS. 13 to 15, in the case of this embodiment example, translation axis T is disposed at a distance from swivel axis 44, in deviation from the embodiment of distal arm section 15 shown in FIG. 6, in which translation axis T and swivel axis 25 are located in an essentially shared plane, so that a transfer of a hammer mill 29 received in tool receptacle 45 from the out-of-operation position shown in FIGS. 13 to 15 to an operating position in which hammer chisel 37 inserted in hammer mill 29 projects beyond distal end 41 of arm section 40 even when bucket 43 is in the open position shown in FIGS. 13 to 15.

The invention claimed is:

1. A manipulator arm (12) for being connected to a manipulator chassis frame (11) disposed in the periphery of a metallurgical smelting furnace including a tapping spout, the manipulator arm (12) having a proximal end (35) for being connected to the manipulator chassis frame (11) and a distal end (16, 41) equipped with a first tool receptacle (17) and serving to be connected to a bucket (20, 43) for excavating the tapping spout, wherein the manipulator arm (12) has a second tool receptacle (18, 45) at its distal end (16, 41), the second tool receptacle (18, 45) being formed irrespectively of the first tool receptacle (17) and adapted to be connected to a hammer mill (29) or a milling machine, and wherein the first tool receptacle (17) is equipped with a swivel joint element (19) for connecting the bucket (20, 43) in such a manner that it swivels about a swivel axis (25, 44), which is disposed at the distal end (16, 41) of the manipulator arm, and the second tool receptacle (18, 45) is equipped with a linear guide element (39) for guiding the second tool receptacle (18, 45) in such a manner along a translational axis T intersecting the swivel axis (25, 44) that a tool of the hammer mill (29) or the milling machine received in the second tool receptacle 18, 45) is guided past the bucket (20, 43).

2. The manipulator arm according to claim 1, wherein the second tool receptacle (18) is formed in such a manner in an arm section (15) forming the distal end of the manipulator arm (12) and equipped with the swivel axis (25) that the arm section (15) forms a guide casing (31) receiving the tool receptacle (18) and having the linear guide element (39) formed in the guide casing (31) and the swivel axis (25) of the first tool receptacle (17) is disposed within the arm section (15) together with the translational axis T of the second tool receptacle (18).

3. The manipulator arm according to claim 1, wherein the second tool receptacle (45) is disposed at a lateral offset to an arm section (40) forming the distal end of the manipulator arm (12) in such a manner that a guide casing (46) receiving the second tool receptacle (45) is disposed beside the arm section (40).

4. The manipulator arm according to claim 2, wherein the second tool receptacle (18, 45) has a tool slide (30, 47) disposed in the guide casing (31, 46) so as to be longitudinally displaceable.

5. A manipulator (10) having a manipulator arm (12) according to claim 1, the manipulator chassis frame being designed as a nonrail-bound manipulator chassis frame.

6. A manipulator (10) having a manipulator arm (12) according to claim 1, the manipulator chassis frame (11) being rail-bound.

7. The manipulator according to claim 6, wherein the manipulator chassis frame (11) is guided in a suspended placement on the rails (21).

* * * * *